Oct. 30, 1962 D. C. BARNETT ETAL 3,061,701
CONTROL APPARATUS
Filed May 13, 1959
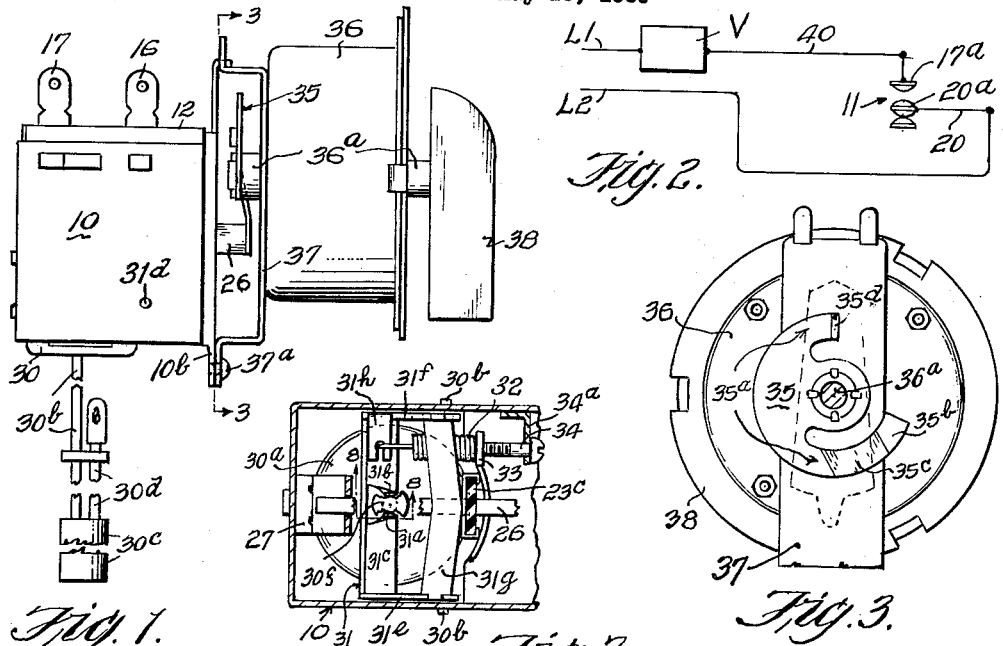
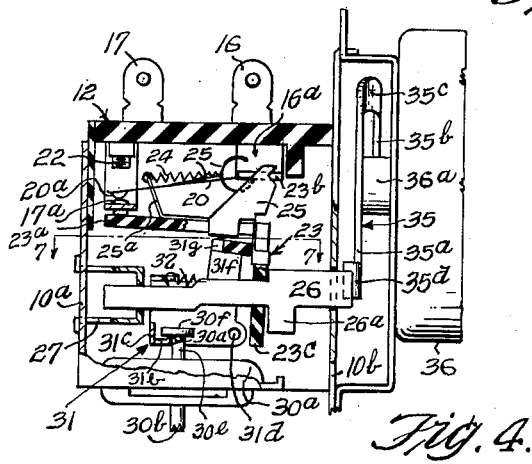
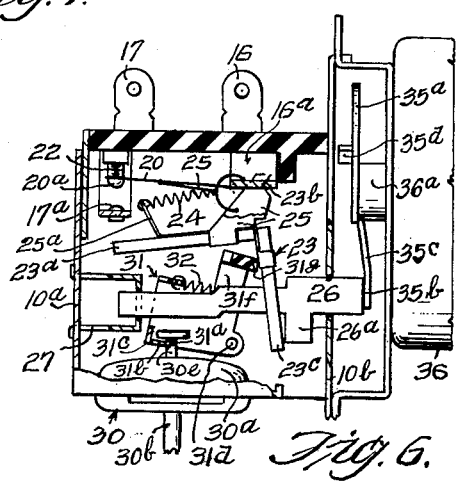
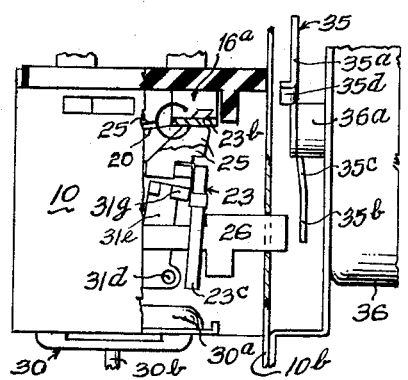
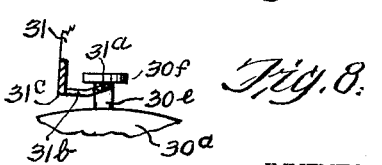
INVENTORS
MARSHALL R. OWEN.
DON C. BARNETT.
BY
Roy E Raney
ATTORNEY

United States Patent Office

3,061,701
Patented Oct. 30, 1962

3,061,701
CONTROL APPARATUS
Don C. Barnett and Marshall R. Owen, Columbus, Ohio, assignors to Ranco Incorporated, Columbus, Ohio, a corporation of Ohio
Filed May 13, 1959, Ser. No. 812,880
2 Claims. (Cl. 200—136.3)

The present invention relates to control apparatus for food vending machines and the like, which automatically prevents vending operation should the temperature of the products to be vended become abnormal.

In certain types of automatic food vending machines the food is normally maintained at predetermined safe temperatures by operation of the machine. To guard against dispensing spoiled food resulting from malfunction of the temperature maintaining component of the machine it is the practice to provide a safety control comprising a thermostat element responsive to the temperature in the food storage compartment and which operates in response to an abnormal temperature to interrupt operation of the dispensing or vending mechanism of the machine. One disadvantage with such a control is that when the storage compartment is opened for reloading food therein, the temperature in the compartment is apt to approach ambient temperature, which is usually in the unsafe temperature range, and although the temperature of the food per se is at a safe degree the thermostatic safety control is largely affected by the air temperature in the chamber and interrupts vending operations until the air temperature is brought to normal. This normalizing of temperature requires an appreciable period of time during which the machine will not vend, although actually the food in the machine is safe for consumption. The disadvantages of this interruption are obvious. The principal object of the present invention is to provide an improved control apparatus responsive to an abnormal temperature in the food storage compartment of a vending machine to terminate the vending operation but which can be set by the person reloading the food compartment to be inoperative for a predetermined period to enable the machine to re-establish normal storage temperatures so that although the air temperature in the compartment may be temporarily in the abnormal or unsafe range, the machine will continue to vend. Should the machine fail to re-establish normal temperatures within the predetermined period mentioned, the control then renders the vending mechanism inoperative until the malfunctioning is remedied.

According to the present invention a control apparatus for a vending machine or the like is provided having a control member movable to a first position to prevent vending operations and to a second position to permit vending and which is urged to the first position by a thermally responsive device subjected to the temperature in the storage compartment for products to be dispensed by the machine should this temperature become abnormal to thereby prevent vending operations but which movement to the first position may be blocked by a timing device for a predetermined period. The timing device can be normally set by an operator at the time the storage compartment is loaded so that the control member is maintained in its second position to continue dispensing operations irrespective of the temperature of the thermal responsive device until the control member is released by the timing device.

More specifically, the invention provides a control apparatus of the character mentioned in which the control member is an actuator for an electric switch in the circuit of a control for the vending mechanism, the actuator arranged to be yieldingly urged in one direction by the thermally responsive device in response to a given temperature condition to deenergize and render inoperative the vending mechanism, and the time device includes a movable element actuated by a cam in a direction to move or maintain the switch actuator in a position to cause the switch to energize the control for the vending mechanism, the cam being manually settable and driven by a timer motor to a position to release the movable element from influencing the actuator after a predetermined period.

Other objects and advantages of the invention will be apparent from the following description of a preferred embodiment of the invention, reference being made to the accompanying drawings wherein—

FIG. 1 is a side elevational view of an improved control apparatus embodying the invention;

FIG. 2 is a schematic electrical wiring circuit of the vending machine;

FIG. 3 is a sectional view taken substantially along line 3—3 of FIG. 1;

FIG. 4 is a side view, partly in section, of the control apparatus shown in FIG. 1;

FIG. 5 is a view similar to FIG. 4 but showing certain parts in different positions;

FIG. 6 is a view similar to FIG. 5 showing the parts in other positions;

FIG. 7 is a sectional view taken substantially along line 7—7 of FIG. 4; and

FIG. 8 is a sectional view taken on line 8—8 of FIG. 7 but on a larger scale.

As mentioned previously, the invention is particularly useful in control apparatus for vending mechanisms of food dispensing machines, and the apparatus shown is particularly suitable for use on a milk dispensing machine having a refrigerated compartment for storage of cartons of milk which are automatically dispensed by an electrically controlled vending mechanism when purchasers deposit the proper coin or coins in a coin box. The dispensing machine is not shown, except for the vending mechanism thereof and which is merely indicated schematically, because it does not form a part of the invention and this type of machine is well known in the art.

The control apparatus comprises a housing 10, preferably formed of sheet metal including a rear well 10a and a front cover plate 10b, which encloses a normally closed electrical snap switch 11 adapted to be connected in the control circuit of the vending mechanism and which is opened by a thermostatic device to break the circuit in the event vending is to be discontinued, as is described hereinafter. Switch 11 is a snap acting type, and although any suitable type may be used, it is like that claimed in U.S. Patent No. 2,651,690. For sake of clarity certain parts thereof are shown schematically and for a more complete description reference may be made to the patent. Suffice to say, the switch includes a base 12 of a suitable insulating material secured in the upper end of the housing, as viewed in the drawings, and two terminal members 16 and 17 are embedded in the base. Terminal 16 includes a bridge or bracket portion 16a which projects into the interior of the housing and one end of a flexible spring contact arm 20 is anchored thereto. A contact 20a is attached to the free end of arm 20 and engages a contact 17a attached to a bridge like portion of terminal 17. Movement of arm 20 from contact 17a is limited by an insulated stop 22 attached to base 12. Contact arm 20 is snap actuated in response to the movement of an L-shape actuator liner 23 which is connected thereto through a tension spring 24 interconnecting a leg 23a of the actuator and a rigid link 25 pivoted at one end to the arm and carrying spaced abutments at the opposite end which engage opposite sides of bridge 16a to limit swinging movement of the link but permit the link to shift positions relative to the contact arm so that the longitudinal bias of the spring tension acts to snap the arm between contact 17a and stop 22. Actuator 23 is pivoted at 23b to bridge 16a on lugs at either side of the bridge and leg 23a shifts the left hand end of tension spring 24 from one side to the other of the centerline of toggle link 25 to actuate contact arm 20. When the actuator is shifted clockwise, as viewed in the drawings, the end of the spring is raised above the centerline of the link causing the right hand end of the latter to shift counterclockwise and bring the lower of its stops against the underside of bracket 16a which results in the toggle link urging arm 20 against contact 17a, as shown in FIG. 4. When actuating member 23 is moved counterclockwise, it shifts the end of spring 24 below the centerline of link 25, causing the link to shift downwardly bringing the upper of its stops into engagement with the upper side of bracket 16a whereupon the link urges the contact arm upwardly to stop 22 to separate the contacts, as shown in FIG. 6.

The axis of pivot 23b for actuator 23 is located so that the end of spring 24 attached to link 25 swings to opposite sides of a line through the axis and the end of the spring connected to the actuator thereby causing the actuator to be biased by the spring in either control position of the switch.

Actuator 23 is adapted to be moved to the switch closing position, or to be retained in that position by a timer controlled bar 26, and for this purpose one leg of the actuator comprises a rigid strip 23c of electrical insulating material having an opening through which the bar, also formed of rigid electrical insulating material, extends. Bar 26 is supported for longitudinal movement by one end projecting through and sliding in an opening in a U-shape bracket 27 attached to wall 10a and the other end of which projects through and slides in an opening in cover plate 10b the edges of the openings forming guides for the bar. A lug 26a on bar 26 engages cover 10b to limit movement of the bar outwardly of the housing and it also engages strip 23c to move the actuator clockwise to the switch closing position or to maintain the actuator in the latter position.

Except during the time bar 26 is mainained in its left hand position to retain the acuator in the switch closed position, actuator 23 may be urged to the switch opening position according to the air temperature inside the storage compartment of the machine by a thermally responsive device 30. Thermostatic element 30, which is of type well known in the art, comprises an expansible metal wafer 30a rigidly supported in the housing and having a capillary tube 30b attached thereto which is connected to a bulb 30c. The bulb, tube and wafer are filled with a suitable thermally responsive fluid through a filling tube 30d, which tube is sealed so that the pressure of the fluid contained therein changes according to the temperature of the bulb, and in the form shown, the fluid pressure in the element is at sub-atmospheric pressure at temperatures at and below those normally maintained in the storage compartment of the vending machine. Bulb 30c is placed in a suitable position within the milk storage compartment so that should the temperature thereof become higher than is safe for storage of milk, the vapor pressure in the bulb increases to cause expansion of wafer 30a. The movable wall of wafer 30a has a post 30e attached thereto which has a head portion 30f, the underside of which is engaged by two fingers 31a and 31b of a lever 31 arranged to transmit movement to actuator 23 according to the expansion movement of the wafer. Lever 31, which is preferably formed of sheet metal having two side walls interconnected by a yoke portion 31c, is pivoted between the side walls of housing 10 on a pivot pin 31d. Preferably, fingers 31a and 31b are twisted so that the edges thereof form line engagements with the under surface of head 30f in the nature of a knife edge bearing. Lever 31 also includes two oppositely disposed legs 31e and 31f between which an insulating bar 31g is supported by lugs on the ends of the bar gripped in notches formed in the legs, as seen in FIG. 7. Bar 31g is preferably V-shaped and the central projecting portion is arranged to engage one face of stop 23c of actuator 23 and move the actuator to the switch opening position when lever 31 is moved clockwise.

Lever 31 is biased clockwise for operating actuator 23 by a tension spring 32, one end of which is hooked in an eye formed in a lug 31h on leg 31f and the other end is attached to a nut 33 threaded on a bolt 34 extending freely through an opening through a lug 34a attached to the side of the housing. It will be seen that spring 32 tends to rotate lever 31 clockwise and fingers 31a and 31b engaging beneath head 30f limits clockwise rotation of lever 31 according to the height of the head, which is determined by the internal pressure within diaphragm 30a. Since the fluid in the thermally responsive device is below atmospheric pressure at normal operating temperatures, should the device lose its charge, diaphragm 30a will expand and permit lever 31 to rotate clockwise and urge the switch actuator to the switch opening position.

It will be appreciated by those familiar with the art that the tension of spring 32 determines the temperature at which lever 31 is moved, and by turning bolt 34 the tension on diaphragm 30a may be adjusted. Furthermore, it will be appreciated that the force of lever 31 acting on actuator 23 cannot exceed that provided by the tension of spring 32 and that diaphragm 30a can expand independently of lever 31, should the actuator be blocked from counterclockwise movement by bar 26, as described hereinafter. By this arrangement, the stresses applied to the switch actuator are limited and cannot mount to a degree which would deform or unduly stress the parts of the control apparatus.

Counterclockwise movement of actuator 23 to open switch 12 may be blocked temporarily to prevent the thermally responsive device 30 from causing opening of the switch as a result of a rise in temperature at bulb 30d which is apt to take place during and shortly after the milk storage compartment of the vending machine is opened for loading, and this blockage is accomplished by controlling the position of bar 26 by a manually settable and timer driven cam 35.

In the form shown, cam 35 is attached to a shaft 36a of a timer 36 which comprises a casing attached to cover plate 10a by a bracket 37, the upper end of which bracket has a portion inserted in an opening through a turned end portion of cover plate 10a and the lower end of which is secured to the cover plate by a screw 37a. Shaft 36a is adapted to be rotated manually clockwise, as viewed in FIG. 3, by a handle or knob 38 attached to the outer end thereof, and a suitable spring wound escapement mechanism, not shown, inside the casing drives the shaft counterclockwise at the rate of about 270° per thirty minutes. The timer shown is manufactured by Lux Clock Manufacturing Co., part No. 2400-FA6-3041, but any other suitable timer could be used.

Cam 35 has a flat surface 35a which extends for about 100° and a flat recessed area 35b joined with surface 35a by a sloping portion 35c. The term "flat" indicates that with the end of bar 26 riding on the flat, no movement is imparted to the bar during rotation of the cam. Surface 35a is positioned to be engaged by the outer end portion of bar 26 to prevent outward movement thereof and thereby maintain switch 12 closed irrespective of the expansion of diaphragm 30 and the temperature in the milk storage compartment, and when the cam is rotated to the position in which portion 35b is aligned with the bar the latter may be moved freely to the right to permit actuator 23 to move to the switch opening position in response to a rise in temperature of bulb 30d. The end portion of cam section 35a is turned as at 35d to form a stop which engages the side of bar 26 to limit rotation of shaft 36a when the shaft is turned by knob 36b to wind the spring escapement motor. This stop defines the "set" position of the timer, and an internal stop, not shown, positions shaft 36a in the "stop" position in which cam section 35c is opposite bar 26. If bar 26 is in its outer position when the shaft is rotated from the "stop" position to "set" position, the bar is forced inwardly by slope 35a, thereby closing switch 12 and maintaining it closed irrespective of expression of wafer 30a until the cam is moved by the spring motor to approximately its "stop" position. This movement requires about thirty minutes and will normally enable the vending machine to bring the temperature of the milk storage compartment to the proper degree.

Referring to FIG. 2, the control circuit of vending mechanism V is connected to a suitable power source comprising lines L1 and L2, and the circuit for the mechanism comprises L1, wire 40 to contact 17a, contact 20a, contact arm 20 and L2. As mentioned previously vending mechanism V forms no part of the invention and is therefore not described in detail, but suffice to say, as long as the control circuit is closed, the vending mechanism is operative but when contacts 17a and 20a are separated to break the circuit, the mechanism will not accept coins and no products can be dispensed.

It will be seen that in the event the temperature within the food compartment rises above a certain safe degree, such as 50°, diaphragm 30a expands due to the increase in internal pressure and permits lever 31 to move actuator 23 counterclockwise and open switch 11, which prevents vending of the food. During normal operation, bar 26 and cam 35 are in the positions shown in FIG. 5 and do not interfere with this switch opening movement. During refilling of the storage compartment of the vending machine, the air temperature in the compartment is likely to rise above 50° which would normally cause switch 11 to be opened, as described. This condition, however, does not warrant cessation of vending operations because the milk is at a proper temperature, and to permit immediate vending until such time as the vending machine has an opportunity to reduce the air temperature in the storage compartment, the attendant rotates knob 38 to cause cam section 35a to move bar 26 and switch actuator 23 to the switch closing position, if the switch is open, as seen in FIG. 6. The bar 26 is retained in the switch closing position irrespective of expansion of diaphragm 30a until the cam is rotated by the escapement mechanism to bring section 35b in alignment with the bar after a lapse of about thirty minutes. If the temperature in the storage compartment is above that desired, bar 26 is no longer effective to prevent normal opening of the switch to terminate the vending operation. On the other hand, if the compartment temperature is normal, actuator 23 remains in the switch closed position.

It will be apparent that by our invention we have provided a relatively simple control device for assuring interruption of the vending operation should temperatures rise above that desired, but on the other hand the safety mechanism can be discontinued for a short period thereby affording an opportunity for the apparatus to attain a normal storage temperature without needlessly interrupting vending. The switch is blocked in its closed position by the timer without causing undue stresses on the parts affected by the response of the thermal element.

Although but one form of the invention has been described, it will be apparent that other forms, modifications and adaptations thereof may be employed all falling within the scope of the following claims.

We claim:

1. Control apparatus comprising a housing, an electric switch in said housing, an actuator in said housing for operating said switch and movable between two switch operating positions, a bar having one end projecting from said housing and arranged to slide longitudinally in said housing to move said actuator to one of said switch operating positions when said bar is moved inwardly, a lever biased to engage and move said actuator from said one switch operating position to the other, a thermally responsive element connected with said lever to control movement thereof, a timer device attached to said housing and having a cam rotatable between two positions and aligned with said one end of said bar and operative to force said bar to its inward position when rotating from one position to the other, and manual means to rotate said cam from said one position to the other, said timer being operable to drive said cam at a given rate from said other position to said one position to release said bar for outward movement, said timer device including a shaft supporting said cam, and said cam comprising a circular member lying in a plane transversely of said bar and having a lug thereon arranged to engage the side of said bar to limit rotation of said cam to said other position.

2. Control apparatus as defined in claim 1 and wherein said thermally responsive element is connected with said lever by means for permitting limited independent movement therebetween, whereby inward movement of said bar can be effected by said cam regardless of the condition of said thermally responsive element.

References Cited in the file of this patent

UNITED STATES PATENTS

| | | |
|---|---|---|
| 1,131,733 | Raymond | Mar. 16, 1915 |
| 2,114,766 | Heitman | Apr. 19, 1938 |
| 2,213,505 | Raney | Sept. 3, 1940 |
| 2,273,282 | Muffly | Feb. 17, 1942 |
| 2,596,039 | McCormick | May 6, 1952 |
| 2,674,665 | Raney et al. | Apr. 6, 1954 |
| 2,729,718 | Libermann | Jan. 3, 1956 |
| 2,788,416 | Kilbury | Apr. 9, 1957 |
| 2,885,513 | Judd | May 5, 1959 |
| 2,915,610 | Miller | Dec. 1, 1959 |

FOREIGN PATENTS

| | | |
|---|---|---|
| 364,975 | Great Britain | Jan. 14, 1932 |